US012427570B2

(12) United States Patent
Kojima

(10) Patent No.: US 12,427,570 B2
(45) Date of Patent: Sep. 30, 2025

(54) SILVER FLAKE POWDER AND PRODUCTION METHOD THEREOF, AND ELECTRICALLY CONDUCTIVE PASTE

(71) Applicant: DOWA ELECTRONICS MATERIALS CO., LTD., Tokyo (JP)

(72) Inventor: Takuya Kojima, Saitama (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 19 days.

(21) Appl. No.: 18/278,725

(22) PCT Filed: Mar. 1, 2022

(86) PCT No.: PCT/JP2022/008687
§ 371 (c)(1),
(2) Date: Aug. 24, 2023

(87) PCT Pub. No.: WO2022/190968
PCT Pub. Date: Sep. 15, 2022

(65) Prior Publication Data

US 2024/0157436 A1 May 16, 2024

(30) Foreign Application Priority Data

Mar. 8, 2021 (JP) ................................ 2021-036402
Feb. 25, 2022 (JP) ................................ 2022-027369

(51) Int. Cl.
*B22F 1/068* (2022.01)
*B22F 1/05* (2022.01)
(Continued)

(52) U.S. Cl.
CPC ................ *B22F 1/068* (2022.01); *B22F 1/05* (2022.01); *B22F 9/04* (2013.01); *H01B 1/22* (2013.01);
(Continued)

(58) Field of Classification Search
CPC ...................................................... B22F 1/068
See application file for complete search history.

(56) References Cited

U.S. PATENT DOCUMENTS 5,389,122 A 2/1995 Glicksman
2006/0179975 A1 8/2006 Yamashina et al.
(Continued)

FOREIGN PATENT DOCUMENTS

CN 104684956 A 6/2015
EP 2 902 427 A1 8/2015
(Continued)

OTHER PUBLICATIONS

International Search Report Issued in International Patent Application No. PCT/JP2022/008687, dated May 10, 2022, along with an English translation thereof.
(Continued)

*Primary Examiner* — William D Young
(74) *Attorney, Agent, or Firm* — GREENBLUM & BERNSTEIN, P.L.C.

(57) ABSTRACT

To provide a flaky silver powder having a tapped density of from 0.8 g/mL to 1.9 g/mL, and a cumulative 50th percentile particle diameter ($D_{50}$) of from 2 μm to 7 μm, where the cumulative 50th percentile particle diameter ($D_{50}$) is measured by laser diffraction or laser scattering particle size analysis.

3 Claims, 5 Drawing Sheets

(51) Int. Cl.
*B22F 9/04* (2006.01)
*H01B 1/22* (2006.01)

(52) U.S. Cl.
CPC ... *B22F 2009/042* (2013.01); *B22F 2009/045* (2013.01); *B22F 2301/255* (2013.01); *B22F 2304/10* (2013.01)

(56) References Cited

U.S. PATENT DOCUMENTS

| | | | | |
|---|---|---|---|---|
| 2010/0127223 | A1 | 5/2010 | Dorfman | |
| 2015/0247067 | A1* | 9/2015 | Iseda | C08K 3/08 252/514 |
| 2021/0155820 | A1* | 5/2021 | Yamaguchi | C09D 11/52 |

FOREIGN PATENT DOCUMENTS

| | | | |
|---|---|---|---|
| JP | 7-76710 | A | 3/1995 |
| JP | 2004-111057 | A | 4/2004 |
| JP | 2006-210214 | A | 8/2006 |
| JP | 2007-254845 | A | 10/2007 |
| JP | 2010-229544 | A | 10/2010 |
| JP | 2011-052300 | A | 3/2011 |
| JP | 2011-252140 | A | 12/2011 |
| JP | 2012-509965 | A | 4/2012 |
| JP | 2012-92442 | A | 5/2012 |
| JP | 2014-080558 | A | 5/2014 |
| JP | 2015-010256 | A | 1/2015 |
| JP | 2015-65098 | A | 4/2015 |
| JP | 2015-178597 | A | 10/2015 |
| JP | 2021-155805 | A | 10/2021 |
| TW | 201413738 | A | 4/2014 |
| WO | 2014/013785 | A1 | 1/2014 |
| WO | 2014/050155 | A1 | 4/2014 |

OTHER PUBLICATIONS

Written Opinion of the International Searching Authority for International Patent Application No. PCT/JP2022/008687, dated May 10, 2022, along with an English translation thereof.

Notice of Reasons for Refusal issued in Japanese Counterpart Patent Appl. No. 2022-027369, mailed Apr. 4, 2023, along with English translation thereof.

Office Action dated Mar. 25, 2024, that issued with respect to corresponding Japanese Patent Application No. 2022-027369 (which issued as JP 7326514 B2).

Extended European Search Report that issued in European Patent Application No. 22766927.2, dated Dec. 10, 2024.

Office Action, dated May 24, 2024, that issued with respect to corresponding Japanese Patent Application No. 2022-027369 (which issued as JP 7326514 B2).

Office Action that issued in corresponding Taiwanese Patent Application No. 111107931 dated Jan. 30, 2024, along with English translation.

Office Action that issued in corresponding Chinese patent application No. 202280019312.X, mailed on Jun. 21, 2025.

* cited by examiner

SILVER FLAKE POWDER AND PRODUCTION METHOD THEREOF, AND ELECTRICALLY CONDUCTIVE PASTE

TECHNICAL FIELD

The present invention relates to a flaky silver powder and a production method thereof, and an electrically conductive paste.

BACKGROUND ART

Electrically conductive pastes, in which a silver powder is dispersed in an organic component, have been used to form electrodes or circuits of electronic components and the like. As a silver powder used to formulate such electrically conductive pastes, a silver powder having flat particle shapes (flaky silver powder) may be used to increase the contact area between particles of the silver powder.

As a production method for a flaky silver powder, a method of mechanically flattening a spherical silver powder has been known. Alternatively, flaky silver particles may be partially obtained according to a wet reduction method where crystal growth of silver particles is slow.

As a flaky silver powder obtained by mechanically flattening, the following flaky silver powder has been known so far. That is, the flaky silver powder having a mean particle diameter $D_{50}$ of from 10 μm to 13 μm as measured by laser diffraction or laser scattering particle size analysis, an aspect ratio ([average major axis (μm)]/[average thickness (μm)]) of from 6 to 15, a specific surface area of 1 $m^2$/g or less, and a tap filling density of from 2.4 g/$cm^3$ to 4.2 g/$cm^3$ (for example, PTL 1).

Moreover, known is a metal powder in which particles having a tapped density of 3.0 g/mL or greater, mean particle diameter $D_{50}$ of from 1 μm to 5 μm, and aspect ratio of from 3 to 30 constitutes 80% or greater of the metal powder based on a number ratio, and an X value (=$D_{50}$ (μm)/BET specific surface area ($m^2$/g)) is 0.5 or less (for example, PTL 2).

CITATION LIST

Patent Literature

[PTL 1] Japanese Unexamined Patent Application Publication (JP-A) No. 2007-254845

[PTL 2] Japanese Unexamined Patent Application Publication (JP-A) No. 2006-210214

SUMMARY OF INVENTION

Technical Problem

It has been considered that a tapped density of a flaky silver powder is preferably greater than 2.0 g/mL. This is based on the insight that use of a flaky silver powder having a large tapped density increases a filling ratio of silver particles in an electrically conductive paste, and contributes to maintain low volume resistivity of an electrically conductive film that is obtained by curing the electrically conductive paste.

In recent years, on the other hand, a flaky silver powder that achieves a reduced amount of silver in an electrically conductive paste and in a cured film has been desired considering the cost. However, a problem is that it is difficult to maintain suitable electric conductivity with an electrically conductive paste whose silver content is reduced.

Moreover, an electrically conductive paste having excellent continuous printability and a flaky silver powder used for the electrically conductive paste are desired for production of electrodes and circuits using printing technology. The excellent continuous printability means desirable printing performance that can be maintained even after printing several times. However, problems still remain in that, as well as low volume resistivity of the electrically conductive paste, it is difficult to obtain a flaky silver powder that achieves excellent continuous printability when the flaky silver powder is used in an electrically conductive paste.

The present invention aims to solve the above-described various problems existing in the related art and to achieve the following object. Specifically, an object of the present invention is to provide a flaky silver powder, with which an electrically conductive paste having excellent continuous printability and low volume resistivity can be obtained.

Solution to Problem

The present invention has been accomplished based on the insights of the present inventors. The means for solving the above-described problems are as follows.

<1> A flaky silver powder, having
a tapped density of from 0.8 g/mL to 1.9 g/mL, and
a cumulative 50th percentile particle diameter ($D_{50}$) of from 2 μm to 7 μm, where the cumulative 50th percentile particle diameter ($D_{50}$) is measured by laser diffraction or laser scattering particle size analysis.

<2> The flaky silver powder according to <1>,
wherein a ratio [$(D_{90}-D_{10})/D_{50}$] of a difference between a cumulative 90th percentile particle diameter ($D_{90}$) of the flaky silver powder and a cumulative 10th percentile particle diameter ($D_{10}$) of the flaky silver powder to the cumulative 50th percentile particle diameter ($D_{50}$) is 1.35 or less, where the cumulative 10th percentile particle diameter ($D_{10}$) and the cumulative 90th percentile particle diameter ($D_{90}$) are measured by laser diffraction or laser scattering particle size analysis.

<3> The flaky silver powder according to <1> or <2>, wherein the tapped density is from 0.8 g/mL to 1.6 g/mL.

<4> A flaky silver powder production method, comprising:
a flaking step of allowing a spherical silver powder to collide with media to flake the spherical silver powder to thereby obtain a flaky silver powder,
wherein the flaking step is carried out in a manner that a ratio (V2/V1) of an average volume V2 to an average volume V1 is 1.0 to 1.5, where the average volume V1 is calculated according to the following equation 1 using a mean primary particle diameter ($D_{sem}$) of the spherical silver powder as measured by a scanning electron microscope, and the average volume V2 is calculated according to the following equation 2 using a cumulative average major axis (L) of the flaky silver powder, and a cumulative average thickness (T) of the flaky silver powder:

$$V1=4/3\times\Pi\times(D_{sem}/2)^3 \quad \text{(Equation 1)}$$

$$V2=T\times\Pi\times(L/2)^2 \quad \text{(Equation 2)}$$

wherein the flaky silver powder has a tapped density of from 0.8 g/mL to 1.9 g/mL.

<5> The flaky silver powder production method according to <4>, wherein a cumulative 50th percentile particle diameter ($D_{50}$) of the spherical silver powder as measured by laser diffraction or laser scattering particle size analysis is from 0.75 μm to 3 μm, and a cumulative 50th percentile particle diameter ($D_{50}$) of the flaky silver powder as measured by laser diffraction or laser scattering particle size analysis is from 2 μm to 7 μm.

<6> An electrically conductive paste, comprising:

the flaky silver powder according to any one of <1> to <3>, wherein an amount of the flaky silver powder is from 30% by mass to 80% by mass.

Advantageous Effects of Invention

The present invention can solve the above-described various problems existing in the related art, can achieve the above-described object, and can provide a flaky silver powder, with which an electrically conductive paste having excellent continuous printability and low volume resistivity can be obtained.

DESCRIPTION OF EMBODIMENTS

Flaky Silver Powder

Figure 1:
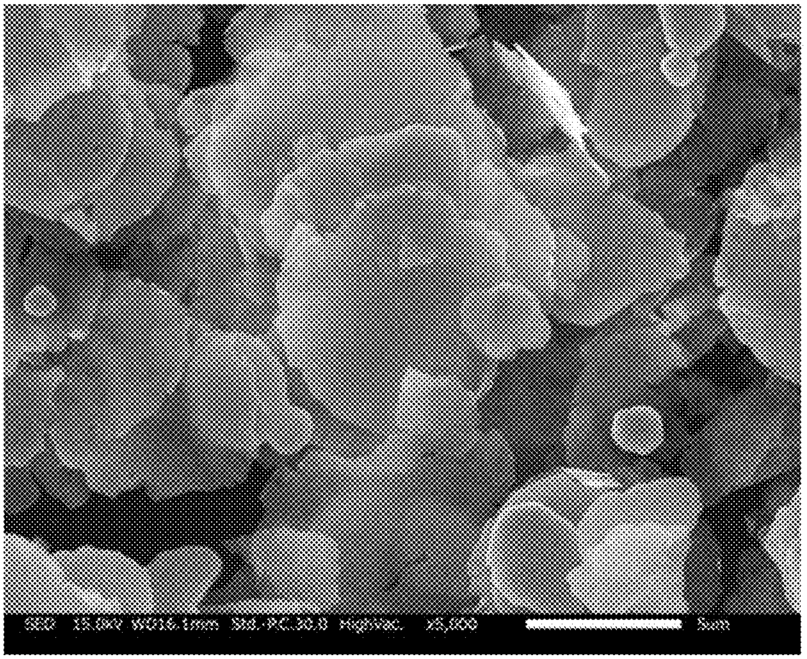
FIG. 1 is a scanning electron microscopic photograph of the flaky silver powder of Example 1.

The flaky silver powder of the present invention has a tapped density of from 0.8 g/mL to 1.9 g/mL, and a cumulative 50th percentile particle diameter ($D_{50}$) of from 2 μm to 7 μm, where the cumulative 50th percentile particle diameter ($D_{50}$) is measured by laser diffraction or laser scattering particle size analysis.

The term "flaky" encompasses shapes that include flat plates, thin rectangles, thin pieces, and scale-like pieces, and have aspect ratios of 2 or greater. The term "spherical" encompasses shapes that are sphere-like shapes and have aspect ratios of less than 2.

A group of silver particles having an average aspect ratio of 2 or greater is referred to as a flaky silver powder. The flaky silver powder may partially include silver particles having other shapes than flakes, such as spherical particles, linear particles, and the like. A group of silver particles having an average aspect ratio of less than 2 is referred to as a spherical silver powder.

The aspect ratio of the flaky silver powder is preferably 10 or greater, more preferably 60 or greater, and yet more preferably 70 or greater. Moreover, the aspect ratio of the flaky silver powder is preferably 400 or less, more preferably 200 or less, and yet more preferably 150 or less. When the aspect ratio of the flaky silver powder is less than 2, the contact area between particles of the flaky silver powder is not sufficient, thus electric conductivity of an electrically conductive film may not be sufficiently high, where the electrically conductive film is formed using an electrically conductive paste in which the flaky silver powder is blended. When the aspect ratio of the flaky silver powder is greater than 400, production of such flaky silver powder becomes difficult.

The aspect ratio of the spherical silver powder is preferably from 1 to 1.5.

The aspect ratio of the flaky silver powder and the aspect ratio of the spherical silver powder can be determined by (cumulative average major axis L/cumulative average thickness T). The "cumulative average major axis L" and the "cumulative average thickness T" are a cumulative average major axis and cumulative average thickness of 100 or more silver particles measured by a scanning electron microscope (SEM).

Specifically, the aspect ratio can be measured in the following manner.

(1) Mixing a silver powder, an epoxy resin, and a curing agent (set name: SpeciFix-20 kit) (silver:resin=about 1:0.7, mass ratio).

(2) Pouring the mixture into a mold and curing at room temperature.

(3) Polishing the cured sample by an ion milling device (ArBlade 5000, produced by Hitachi High-Tech Corporation) to prepare a cross-section of the sample.

(4) Observing the cross-section of the polished sample under SEM, and measuring a minor axis (minimum distance that can be confined with a pair of horizontal lines) of the cross-section of the silver particle along a thickness direction of the silver particle under SEM to determine the measured minor axis as a thickness of the silver particle.

(Magnification of observation: ×15,000, approximately 20 silver particles per field of view, measuring approximately 100 to 150 particles)

(5) Determining, as a cumulative average thickness (T), a cumulative 50th percentile thickness of the measured thickness data on number basis.

(6) Dispersing the silver powder on an electrically conductive tape placed on the stage of SEM, observing the silver powder under SEM, and measuring a major axis (maximum distance that can be confirmed with a pair of horizontal lines) of the silver particle the outer boundary of which can be observed under SEM. (Magnification of observation: ×2,000, approximately 10 silver particles per field of view, measuring approximately 100 to 150 particles)

(7) Determining, as a cumulative average major axis (L), a cumulative 50th percentile diameter of the measured length data on number basis.

(8) Determining the cumulative average major axis (L)/cumulative average thickness (T) as an aspect ratio.

The cumulative average thickness of the flaky silver powder is preferably from 41 nm to 100 nm, more preferably from 42 nm to 70 nm, and yet more preferably from 50 nm to 70 nm.

The cumulative average major axis of the flaky silver powder is preferably from 3 μm to 7 μm, more preferably from 5 μm to 7 μm.

The tapped density of the flaky silver powder is from 0.8 g/mL to 1.9 g/mL, preferably from 0.8 g/mL to 1.6 g/mL, and more preferably from 1.0 g/mL to 1.6 g/mL.

When the tapped density is greater than 1.9 g/mL, although a reason is not clear, viscosity of an electrically conductive paste including the flaky silver powder becomes low and the electrically conductive paste spreads towards the peripheral area of the electrically conductive paste during printing (also referred to as "bleeding"), thus circuits formed of an electrically conductive film obtained by curing the electrically conductive paste causes short-circuiting, which may obstruct formation of sufficiently fine lines. When the tapped density is less than 0.8 g/mL, it is difficult to maintain suitable electrical conductivity of an electrically conductive paste including the flaky silver powder.

When the tapped density is 1.6 g/mL or less, adequate viscosity of the electrically conductive paste including the flaky silver powder can be obtained, formation of fine lines can be suitably achieved, and suitable electric conductivity of the electrically conductive paste can be maintained.

As a measuring method for the tapped density of the flaky silver powder, for example, a tapped density measuring device (bulk specific gravity measuring device SS-DA-2, produced by SHIBAYAMA SCIENTIFIC CO., LTD.) is used, 15 g of the silver powder is weighed and collected in a 20 mL test tube, the test tube is tapped 1,000 times each with the drop of 20 mm, and the tapped density of the silver powder is calculated according to the following equation.

Tapped density=sample weight (15 g)/sample volume (mL) after tapping

The cumulative 50th percentile (50% by mass) particle diameter ($D_{50}$) of the flaky silver powder as measured by laser diffraction or laser scattering particle size analysis is from 2 μm to 7 μm, preferably from 3 μm to 7 μm, more preferably from 5 μm to 7 μm, and yet more preferably from 5.3 μm to 7 μm.

When the cumulative 50th percentile (50% by mass) particle diameter ($D_{50}$) is less than 2 μm, the particles of the flaky silver powder are not sufficiently flattened, thus an effect of the flaky silver powder to reduce volume resistivity may not be obtained. When the cumulative 50th percentile (50% by mass) particle diameter ($D_{50}$) is greater than 7 μm, clogging of a channel of a device with the flaky silver powder tends to occur during printing, which may impair continuous printability.

The laser diffraction or laser scattering particle size analysis can be performed, for example, by a laser diffraction or laser scattering particle size distribution analyzer (Microtrac MT-3300 EXII, produced by MicrotracBEL Corp.).

Specifically, 0.1 g of a silver powder is added to 40 mL of isopropyl alcohol (IPA), and the resulting mixture is dispersed for 2 minutes by an ultrasonic homogenizer (US-150T, produced by NIHONSEIKI KAISHA LTD.; 19.5 kHz, chip-edge diameter: 18 mm), followed by measuring the particle size of the silver powder using a laser diffraction or laser scattering particle size distribution analyzer (Microtrac MT-3300 EXII, produced by MicrotracBEL Corp.).

$[(D_{90}-D_{10})/D_{50}]$

The ratio $[(D_{90}-D_{10})/D_{50}]$ of a difference between a cumulative 90th percentile particle diameter ($D_{90}$) of the flaky silver powder and a cumulative 10th percentile particle diameter ($D_{10}$) of the flaky silver powder to the cumulative 50th percentile particle diameter ($D_{50}$) of the flaky silver powder is preferably 1.35 or less, more preferably 1.32 or less, and yet more preferably 1.27 or less, where the cumulative 10th percentile particle diameter ($D_{10}$), the cumulative 90th percentile particle diameter ($D_{90}$), and the cumulative 50th percentile particle diameter ($D_{50}$) are measured by laser diffraction or laser scattering particle size analysis.

When the ratio $[(D_{90}-D_{10})/D_{50}]$ is 1.35 or less, a desirable flaky silver powder can be obtained, where the desirable flaky silver powder includes a small proportion of coarse particles of the flaky silver powder and a small proportion of the particles that have not caused plastic deformation, as a result of the flaking of the spherical silver particle. The coarse particles are particles formed by joining the particles with one another due to the impact applied by the beads to increase the volume of each particle. Such flaky silver powder can be suitably produced by the flaky silver powder production method of the present invention described later.

The ignition loss of the flaky silver powder is also referred to as Ig-Loss, and indicates an amount of change in weight caused when the flaky silver powder is heated from room temperature to 800° C. Specifically, the ignition loss indicates an amount of the components included in the flaky silver powder other than silver. The ignition loss is used as an index for an amount of residual components, such as a surface treatment agent included in a spherical silver powder, and a lubricant added to silver slurry to perform flaking, as components remaining in the flaky silver powder.

The ignition loss of the flaky silver powder is not particularly limited, and may be appropriately selected according to the intended purpose. The ignition loss is preferably from 0.05% to 5.0%, more preferably from 0.3% to 3.0%.

Silver Flake Powder Production Method

The flaky silver powder production method of the present invention is a production method of the flaky silver powder of the present invention. The flaky silver powder production method includes a flaking step, and may further include other steps, as necessary.

<Flaking Step>

The flaking step is a step that includes allowing a spherical silver powder to collide with media to flake the spherical silver powder to thereby obtain a flaky silver powder.

The flaking step is carried out in a manner that a ratio (V2/V1) of an average volume V2 to an average volume V1 is 1.0 to 1.5, where the average volume V1 is calculated according to the following equation 1 using a mean primary particle diameter ($D_{sem}$) of the spherical silver powder as measured by a scanning electron microscope, and the average volume V2 is calculated according to the following equation 2 using a cumulative average major axis (L) of the flaky silver powder, and a cumulative average thickness (T) of the flaky silver powder:

$$V1=4/3\times\Pi\times(D_{sem}/2)^3 \quad \text{(Equation 1)}$$

$$V2=T\times\Pi\times(L/2)^2 \quad \text{(Equation 2)}$$

Moreover, a tapped density of the flaky silver powder is from 0.8 g/mL to 1.9 g/mL.

[Spherical Silver Powder]

A spherical silver powder (also referred to as an original powder), which is a starting material used for the flaking step, is a silver powder including particles having sphere-like shapes and having aspect ratios of less than 2.

The spherical silver powder may be a commercially available product, or may be produced by any of production methods known in the related art (e.g., a wet reduction method). Examples of the commercially available product include AG-4-8F, AG-3-8W, AG-3-8FDI, AG-4-54F, AG-5-54F (all produced by DOWA ELECTRONICS MATERIALS CO., LTD.), and the like. For example, the details of the wet reduction method are described in JP-A No. 07-76710.

The cumulative 50th percentile particle diameter ($D_{50}$) of the spherical silver powder as measured by laser diffraction or laser scattering particle size analysis is preferably from 0.75 μm to 3 μm, more preferably from 1 μm to 2.5 μm.

The mean primary particle diameter ($D_{sem}$) of the spherical silver powder measured by a scanning electron microscope is preferably from 0.74 μm to 1.94 μm, more preferably from 0.8 μm to 1.7 μm.

The mean primary particle diameter ($D_{sem}$) of the spherical silver powder can be determined by measuring circular-equivalent diameters (Heywood diameters) of arbitrary 50 or more silver particles on an image of the spherical silver powder captured by SEM, and calculating a mean value. For example, the mean primary particle diameter ($D_{sem}$) of the spherical silver powder can be determined on an image captured with magnification of ×5,000, using image shape measuring software, such as Mac-View (produced by MOUNTECH Co., Ltd.), and the like.

The average volume (V1) (μm$^3$) of the spherical silver powder can be calculated according to the following equation 1 using the mean primary particle diameter ($D_{sem}$) (μm) of the spherical silver powder.

$$V1=4/3\times\Pi\times(D_{sem}2)^3 \quad \text{(Equation 1)}$$

Moreover, the average volume (V2) (μm$^3$) of the flaky silver powder can be calculated according to the following equation 2 using the cumulative average major axis (L) (μm) of the flaky silver powder and the cumulative average thickness (T) (μm) of the flaky silver powder.

$$V2=T\times\Pi\times(L/2)^2 \quad \text{(Equation 2)}$$

The ratio (V2/V1) of the average volume V2 to the average volume V1 represents an average volume change of the silver particles through flaking. When the silver particles collide with media to flake the silver particles, the ratio becomes close to 1 unless the silver particles may be joined with one another to form joined particles, or flakes are torn as a thickness thereof becomes too thin.

The ratio (V2/V1) is from 1.0 to 1.5, more preferably from 1.0 to 1.3.

The average volume V1 and the average volume V2 can be appropriately selected to satisfy the ratio (V2/V1). The average volume V1 is preferably from 0.21 μm$^3$ to 3.8 μm$^3$, more preferably from 0.27 μm$^3$ to 2.6 μm$^3$. The average volume V2 is preferably from 0.32 μm 3 to 3.8 μm 3, more preferably from 0.35 μm$^3$ to 2.7 μm$^3$.

As the flaking is carried out in the production method of the present invention so that the ratio (V2/V1) is from 1.0 to 1.5, the flaky silver powder having a tapped density of from 0.8 g/mL to 1.9 g/mL is obtained. It is difficult to determine the progress of flaking inside a device during the flaking step. For example, the media are allowed to collide with each of spherical silver particles approximately once to cause the plastic change from spherical particles to flaky particles, but flaking is preferably adjusted with the condition of the ratio (V2/V1) to avoid any change more than the above-described change.

The cumulative 50th percentile particle diameter ($D_{50}$) of the flaky silver powder as measured by laser diffraction or laser scattering particle size analysis is preferably from 2 μm to 7 μm, more preferably from 3 μm to 7 μm, yet more preferably from 5 μm to 7 μm, and particularly preferably from 5.3 μm to 7 μm.

A device used to perform the flaking is not particularly limited, and may be appropriately selected according to the intended purpose. Examples of the device include media-stirring mills, such as bead mills, ball mills, attritors, and the like. Among the above-listed examples, a wet media-stirring mill is preferably used.

In a wet media-stirring mill, a device including media, such as beads, is charged with slurry in which silver particles are included in a solvent, and the silver particles are stirred together with the media to cause plastic deformation of the silver particles.

Moreover, productivity varies depending on centrifugal force applied to the media or silver particles when the media collide with the silver particles. The energy applied when the media collide with the silver particles can be increased by setting the centrifugal force to an appropriate range, thus a flaky silver powder having a suitable aspect ratio can be produced with high productivity.

The beads (media) are preferably spherical beads (media) having diameters of from 0.1 mm to 3 mm. When the diameters of the beads (media) are less than 0.1 mm, separation efficiency is lowered due to clogging of the mill with the media, and the like, when the flaky silver powder and the media are separated after the flaking. When the diameters of the beads (media) are greater than 3 mm, the mean particle diameter of the obtained flaky silver powder may become excessively large.

A material of the media is not particularly limited, provided that the media can cause plastic deformation of silver particles as a result of collision between the media and the silver particles. The material of the media may be appropriately selected according to the intended purpose. Examples of the material include: ceramics, such as zirconia, alumina, and the like; glass; metals, such as titanium, stainless steel, and the like; and the like. Among the above-listed examples, zirconia is preferred to avoid possible low reproducibility due to abrasion of the media. A main element (e.g., Zr and Fe) constituting the media may be sometimes included in the flaky silver powder by approximately 1 ppm to approximately 10,000 ppm as a result of the collision between the media and the silver powder, thus the media may be selected according to the intended use of the flaky silver powder.

An amount of the beads (media) added during the flaking is not particularly limited, and may be appropriately selected according to the intended purpose. The amount of the beads (media) is preferably from 30% by volume to 95% by volume relative to a volume of a device. When the amount is 30% by volume or less, a processing time may be prolonged or processing costs may increase as the number of beads (media) to collide with decreases. When the amount is greater than 95% by volume, the device is excessively packed with the beads (media), thus it may be difficult to operate the device.

The processing time for the flaking is not particularly limited, and may be appropriately selected according to the intended purpose. The processing time is preferably from 10 minutes to 50 hours. When the processing time is shorter than 10 minutes, it may be difficult to obtain a flaky silver powder having a sufficiently suitable aspect ratio. When the processing time is longer than 50 hours, the longer processing time does not add any beneficial effect and the process becomes uneconomical. Note that, the flaking is not necessarily to flake the entire silver powder loaded in the device. The flaky silver powder may also include a silver powder that is not flaked after the flaking.

<Other Steps>

Examples of the above-mentioned other steps include a spherical silver powder production step, a washing step, a drying step, and the like.

Electrically Conductive Paste

The electrically conductive paste of the present invention is an electrically conductive paste including the flaky silver powder of the present invention. Examples of the electrically conductive paste include a resin-curable electrically conductive paste.

The amount of the flaky silver powder is from 30% by mass to 80% by mass, preferably from 40% by mass to 70% by mass, relative to a total amount of the electrically conductive paste.

The viscosity of the electrically conductive paste is not particularly limited, and may be appropriately selected according to the intended purpose. The viscosity is preferably from 200 Pa·s to 900 Pa·s, more preferably from 200 Pa·s to 600 Pa·s, and yet more preferably from 300 Pa·s to 500 Pa·s at the paste temperature of 25° C. and the number of rotations of 1 rpm.

When the viscosity of the electrically conductive paste is less than 200 Pa·s, "bleeding" may occur during printing. When the viscosity of the electrically conductive paste is greater than 900 Pa·s, uneven printing may occur.

For example, the viscosity of the electrically conductive paste can be measured by an E-type viscometer (DV-III+, produced by Brookfield Engineering Labs., Inc.) with a cone spindle CP-52, at the paste temperature of 25° C. and the number of rotations of 1 rpm.

A production method of the electrically conductive paste is not particularly limited, and may be appropriately selected from methods known in the related art according to the intended purpose. For example, the electrically conductive paste can be produced by mixing the flaky silver powder with a resin.

The resin is not particularly limited, and may be appropriately selected according to the intended purpose. Examples of the resin include an epoxy resin, an acrylic resin, a polyester resin, a polyimide resin, a polyurethane resin, a phenoxy resin, a silicone resin, and a mixture of any of the foregoing resins.

The amount of the flaky silver powder in the electrically conductive paste is not particularly limited, and may be appropriately selected according to the intended purpose. The flaky silver powder of the present invention may be mixed with another silver powder.

Since the electrically conductive paste of the present invention includes the flaky silver powder of the present invention, the electrically conductive paste has excellent electrical conductivity, and is suitably used for current collectors of solar battery cells, external electrodes of chip-type electronic components, electrodes or electric wiring of RFID, electromagnetic shields, membrane switches, electroluminescent elements, or the like, or electrically conductive adhesives for adhering transducers, adhering between solar battery cells, such as shingled cells, and the like.

EXAMPLES

Examples of the present invention will be described hereinafter, but the present invention is not limited by Examples in any way.

Example 1

<Production of Flaky Silver Powder>

A spherical silver powder (AG-4-8F, produced by DOWA ELECTRONICS MATERIALS CO., LTD.) was provided as a silver powder (original powder) used for flaking. $D_{50}$ of the spherical silver powder AG-4-8F as measured by laser diffraction particle size analysis was 1.95 μm, and the mean primary particle diameter $D_{sem}$ of the spherical silver powder AG-4-8F was 1.38 μm, where the mean primary particle diameter $D_{sem}$ was determined by measuring circular-equivalent diameters (Heywood diameters) of arbitrary 50 or more silver particles on an image captured by a scanning electron microscope (SEM).

—Flaking Step—

To 2.49 kg of the spherical silver powder, 74.6 g (an amount that constituted 3.0% by mass relative to the amount of the silver powder) of oleic acid was added as a lubricant. The resulting mixture was mixed with 5.80 kg of a mixed solution (Neoethanol P-7, produced by DAISHIN CHEMICAL CO., LTD.) that included ethanol as main component and served as a solvent. The resulting mixture was stirred by a stirrer to thereby prepare 8.36 kg of silver slurry in total (percentage of silver slurry: 29.8% by mass of the silver powder concentration).

A bead mill device LMZ2 (produced by Ashizawa Finetech Ltd., volume: 1.65 L, outer diameter of stirring pin: 11.6 cm) was charged with the obtained silver slurry, and the silver slurry was mixed and stirred under the following conditions to cause plastic deformation of the spherical silver powder in the silver slurry, to thereby prepare flaky silver particles. Media: partially stabilized zirconia (PSZ) beads having a diameter of 0.8 mm (TORAYCERAM beads AGB-K-0.8, produced by TORAY INDUSTRIES, INC.) Amount of media: 5.19 kg (bead filling ratio: 85% by volume) Bead mill driving conditions: rim speed of 14 m/s (number of rotations: 2,305 rpm, 344 G), processed for 2.5 hours Moreover, the mixing and stirring were carried out by connecting the tank storing the obtained silver slurry and the bead mill device via a pump to perform circulation operation to return the silver slurry, which had been fed from the tank to the bead mill device, from the outlet of the bead mill device to the tank. During the operation of the bead mill, the feeding rate of the silver slurry was set to 4 L/min.

Thereafter, the beads and the slurry were separated by a separator of the bead mill device, to thereby obtain slurry including a flaky silver powder. Then, the slurry was filtered with a filter to obtain a wet cake of the flaky silver powder. Thereafter, the wet cake was dried at 50° C. for 10 hours by a vacuum dryer. The resulting dried cake was ground by a blender for 1 minute, followed by sieving with a vibrating screen having the opening size of 40 μm, to thereby obtain a flaky silver powder of Example 1.

The scanning electron microscopic photograph of the flaky silver powder obtained in Example 1 with the magnification of ×5,000 is depicted in FIG. 1.

Example 2

A flaky silver powder of Example 2 was obtained in the same manner as in Example 1, except that the bead diameter was changed to 0.5 mm (TORAYCERAM beads AGB-K-0.5, produced by TORAY INDUSTRIES, INC.) and the processing time was changed to 3 hours.

Figure 2:
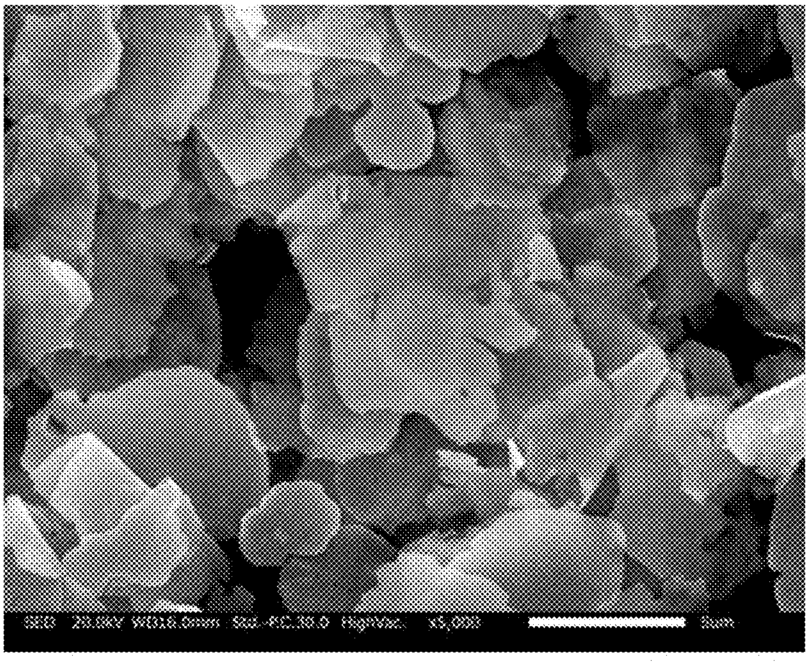
FIG. 2 is a scanning electron microscopic photograph of the flaky silver powder of Example 2.

The scanning electron microscopic photograph of the flaky silver powder obtained in Example 2 with the magnification of ×5,000 is depicted in FIG. 2.

Example 3

A flaky silver powder of Example 3 was obtained in the same manner as in Example 1, except that the bead diameter was changed to 1.0 mm (TORAYCERAM beads AGB-K-1.0, manufactured by TORAY INDUSTRIES, INC.) and the processing time was changed to 2 hours.

Figure 3:
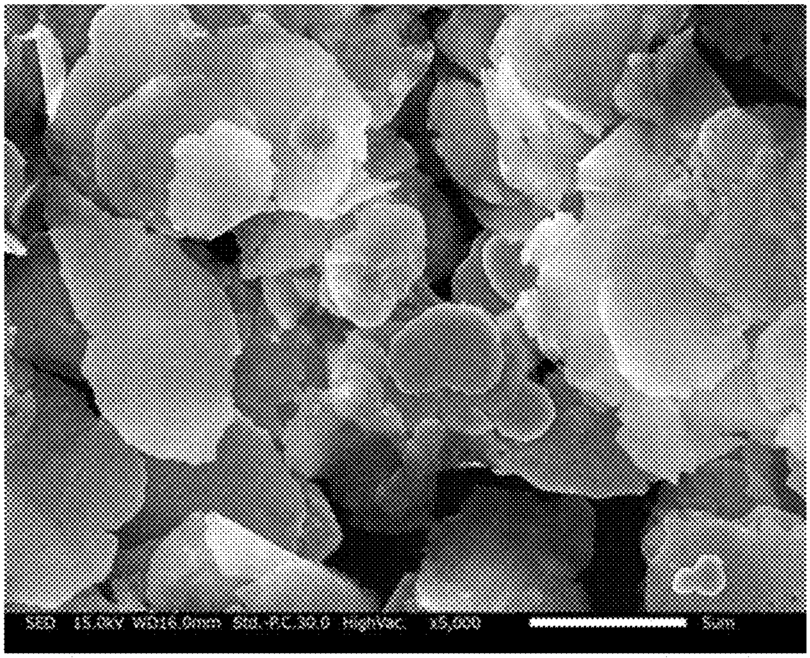
FIG. 3 is a scanning electron microscopic photograph of the flaky silver powder of Example 3.

The scanning electron microscopic photograph of the flaky silver powder obtained in Example 3 with the magnification of ×5,000 is depicted in FIG. 3.

Comparative Example 1

<Production of Flaky Silver Powder>

With 644 g of the spherical silver powder described in Example 1, 12.9 g (2.0% by mass relative to the silver powder) of oleic acid and 966 g of Neoethanol P-7 were mixed, and the resulting mixture was stirred by a stirrer to prepare 1,622.9 g of silver slurry in total (percentage of silver slurry: 39.7% by mass of the silver powder concentration).

An attritor (MA-1SE-X, produced by NIPPON COKE & ENGINEERING CO., LTD.) was charged with the obtained silver slurry, and the silver slurry was mixed and stirred under the following conditions to cause plastic deformation of the spherical silver powder in the silver slurry, to thereby prepare flaky silver particles.

Media: SUS304 beads having a diameter of 1.6 mm

Amount of media: 16.62 kg (bead filling ratio: 65% by volume) Attritor driving conditions: number of rotation of 360 rpm, processed for 6 hours Then, the slurry was filtered with a filter to obtain a wet cake of the flaky silver powder. Thereafter, the wet cake was dried at 70° C. for 10 hours by a vacuum dryer. The resulting dried cake was ground by a blender for 1 minute, followed by sieving with a vibrating screen having the opening size of 40 μm, to thereby obtain a flaky silver powder of Comparative Example 1.

Figure 4:
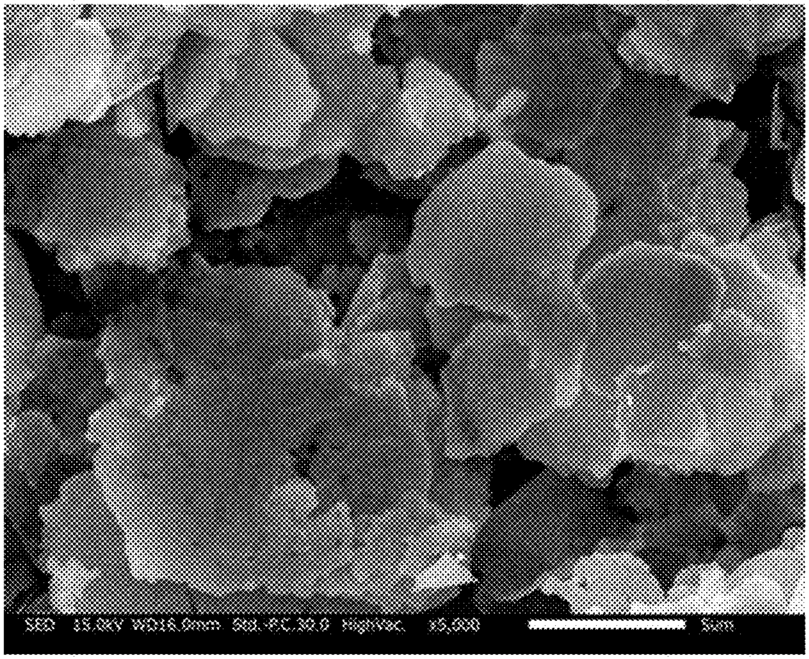
FIG. 4 is a scanning electron microscopic photograph of the silver powder of Comparative Example 1.

The scanning electron microscopic photograph of the flaky silver powder obtained in Comparative Example 1 with the magnification of ×5,000 is depicted in FIG. 4.

Comparative Example 2

A spherical silver powder (AG-3-8W, produced by DOWA ELECTRONICS MATERIALS CO., LTD.) was provided as a silver powder (original powder) used for flaking. $D_{50}$ of the spherical silver powder AG-3-8W as measured by laser diffraction particle size analysis was 1.91 μm, and the mean primary particle diameter $D_{sem}$ of the spherical silver powder was 0.85 μm, where the mean primary particle diameter $D_{sem}$ was determined by measuring circular-equivalent diameters (Heywood diameters) of arbitrary 50 or more silver particles on an image captured by a scanning electron microscope (SEM).

A flaky silver powder of Comparative Example 2 was obtained in the same manner as in Comparative Example 1, except that the spherical silver powder was changed from AG-4-8F to AG-3-8W, the spherical silver powder (1,250 g), the oleic acid (18.8 g), Neoethanol P-7 (966 g) were mixed, the resulting mixture was stirred by a stirrer to prepare 2,234.8 g of silver slurry in total, and the amount of the media was changed to 10.5 kg (bead filling ratio: 42% by volume).

Figure 5:
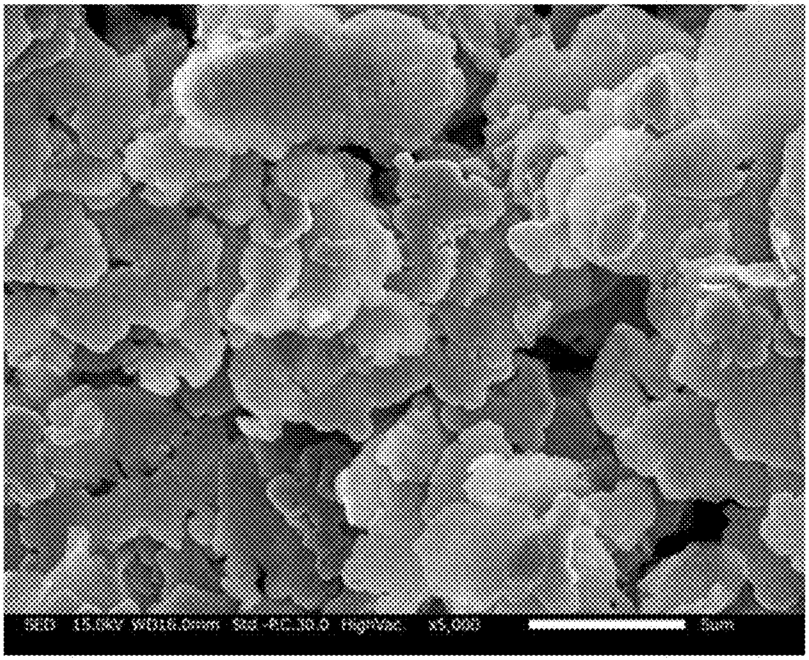
FIG. 5 is a scanning electron microscopic photograph of the silver powder of Comparative Example 2.

The scanning electron microscopic photograph of the flaky silver powder obtained in Comparative Example 2 with the magnification of ×5,000 is depicted in FIG. 5.

Comparative Example 3

A flaky silver powder of Comparative Example 3 was obtained in the same manner as in Example 2, except that the processing time for the flaking was changed to 1 hour.

Figure 6:
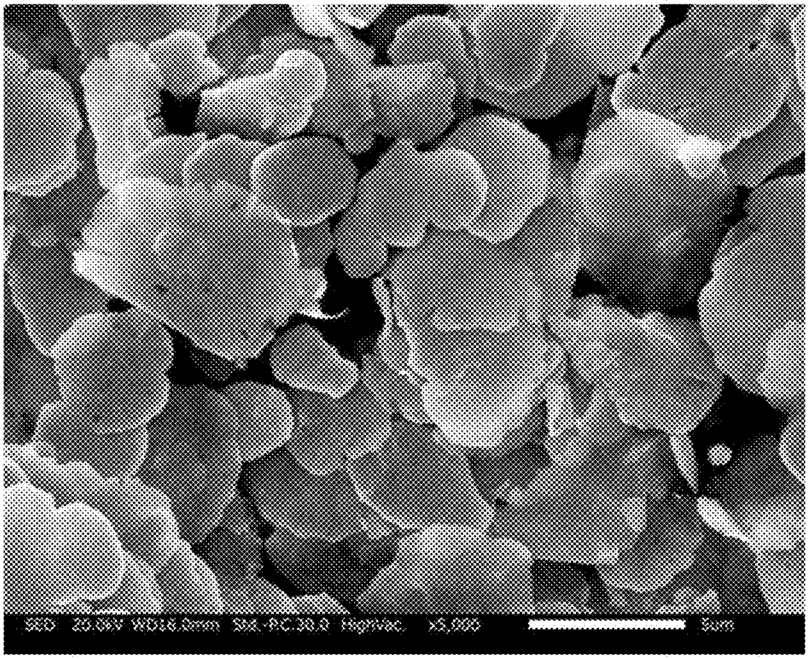
FIG. 6 is a scanning electron microscopic photograph of the silver powder of Comparative Example 3.

The scanning electron microscopic photograph of the flaky silver powder obtained in Comparative Example 3 with the magnification of ×5,000 is depicted in FIG. 6.

Example 4

A flaky silver powder of Example 4 was obtained in the same manner as in Example 1, except that, in the flaking step of Example 1, the amount of the spherical silver powder was changed to 3.75 kg, and the amount of the oleic acid serving as a lubricant was changed to 112.5 g (the amount constituting 3.0% by mass relative to the amount of the silver powder), the mixture was mixed with 5.62 kg of the mixed solution (Neoethanol P-7, produced by DAISHIN CHEMICAL CO., LTD.) that included ethanol as main component and served as a solvent, the resulting mixture was stirred by a stirrer to prepare 9.48 kg of silver slurry in total (percentage of silver slurry: 39.6% by mass of the silver powder concentration), and the processing time under the bead mill operation conditions was changed to 4 hours.

Figure 7:
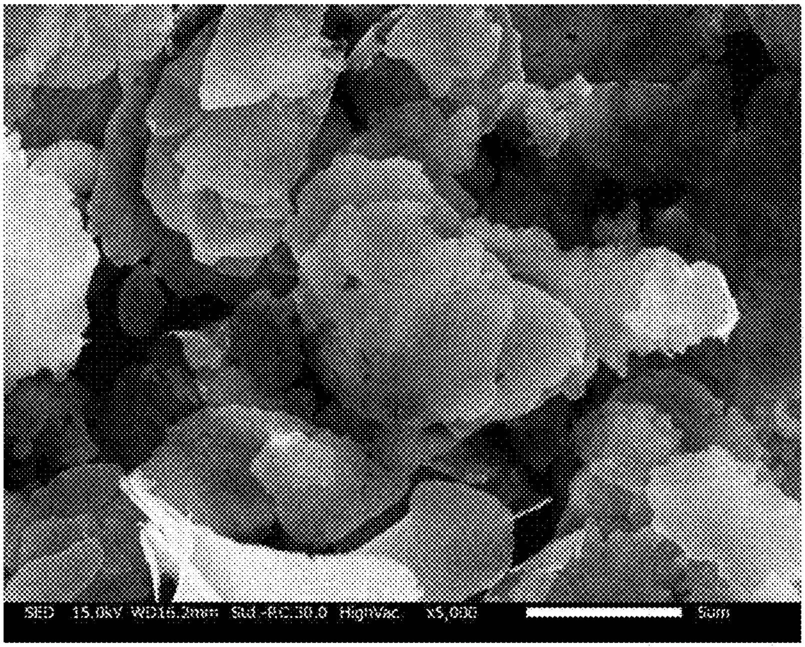
FIG. 7 is a scanning electron microscopic photograph of the flaky silver powder of Example 4.

The scanning electron microscopic photograph of the flaky silver powder obtained in Example 4 with the magnification of ×5,000 is depicted in FIG. 7.

Example 5

A spherical silver powder (AG-4-54F, produced by DOWA ELECTRONICS MATERIALS CO., LTD.) was provided as a silver powder (original powder) used for flaking. $D_{50}$ of the spherical silver powder AG-4-54F as measured by laser diffraction particle size analysis was 1.81 μm, and the mean primary particle diameter $D_{sem}$ of the spherical silver powder AG-4-54F was 1.26 μm, where the mean primary particle diameter $D_{sem}$ was determined by measuring circular-equivalent diameters (Heywood diameters) of arbitrary or more silver particles on an image captured by a scanning electron microscope (SEM).

A flaky silver powder of Example 5 was obtained in the same manner as in Example 1, except that, in the flaking step, the bead diameter was changed to 1.0 mm (TORAYCERAM beads AGB-K-1.0, produced by TORAY INDUSTRIES, INC.), the amount of the media was changed to 5.50 kg (bead filling ratio: 90% by volume), the feeding rate of the silver slurry during the operation of the bead mill was changed to 6 L/min, and the processing time was changed to 2.5 hours.

Figure 8:
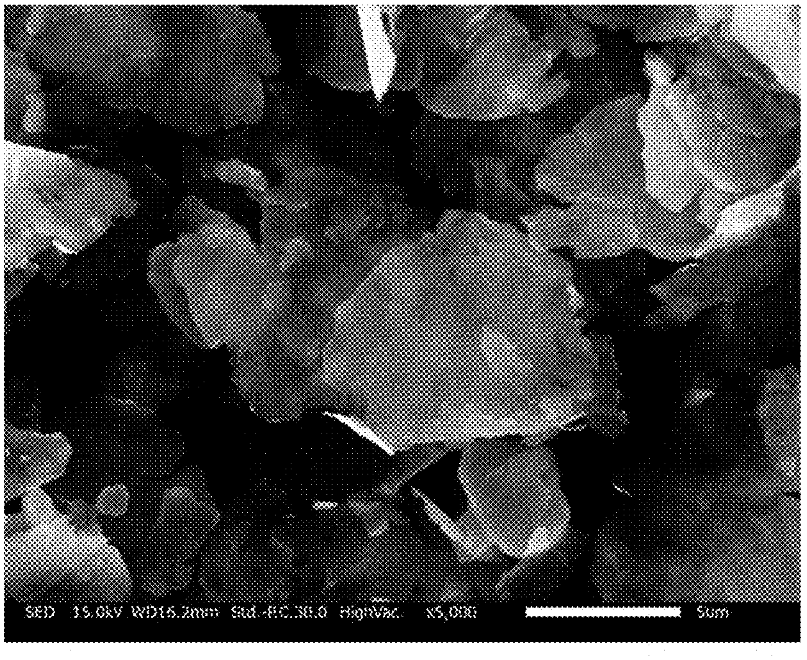
FIG. 8 is a scanning electron microscopic photograph of the flaky silver powder of Example 5.

The scanning electron microscopic photograph of the flaky silver powder obtained in Example 5 with the magnification of ×5,000 is depicted in FIG. 8.

Example 6

A spherical silver powder (AG-3-8FDI, produced by DOWA ELECTRONICS MATERIALS CO., LTD.) was provided as a silver powder (original powder) used for flaking. $D_{50}$ of the spherical silver powder AG-3-8FDI as measured by laser diffraction particle size analysis was 1.61 μm, and the mean primary particle diameter $D_{sem}$ of the spherical silver powder AG-3-8FDI was 1.17 μm, where the mean primary particle diameter $D_{sem}$ was determined by measuring circular-equivalent diameters (Heywood diameters) of arbitrary 50 or more silver particles on an image captured by a scanning electron microscope (SEM).

A flaky silver powder of Example 6 was obtained in the same manner as in Example 1, except that, in the flaking step, the amount of the media was changed to 5.50 kg (bead filling ratio: 90% by volume), the feeding rate of the silver slurry during the operation of the bead mill was changed to 5 L/min, and the processing time was changed to 4 hours.

Figure 9:
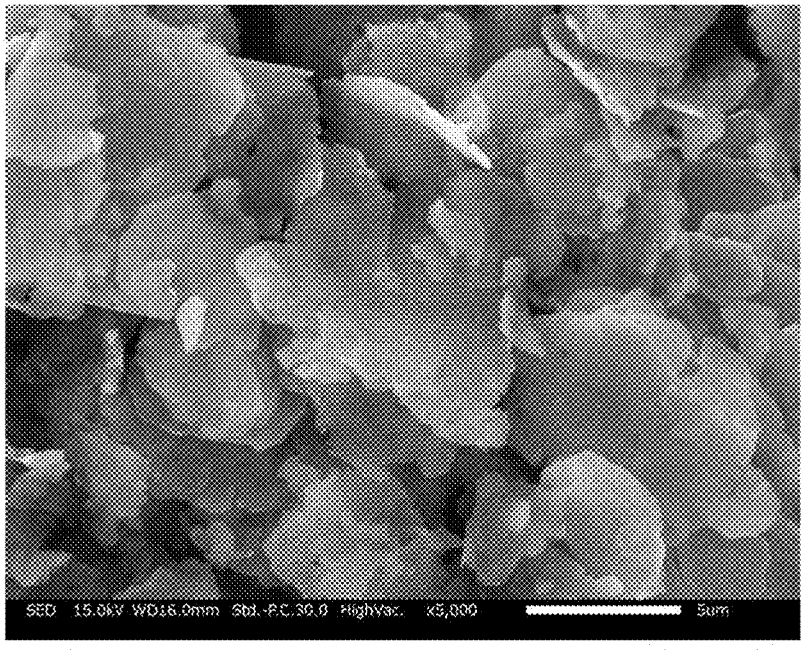
FIG. 9 is a scanning electron microscopic photograph of the flaky silver powder of Example 6.

The scanning electron microscopic photograph of the flaky silver powder obtained in Example 6 with the magnification of ×5,000 is depicted in FIG. 9.

Next, the flaky silver powders of Examples 1 to 6 and Comparative Examples 1 to 3 were each subjected to measurement of a particle size distribution, an aspect ratio, an average volume, and a tapped density in the following manner. The results are presented in Table 1.

<Particle Size Distribution Measuring Method>

A cumulative 10th percentile particle diameter ($D_{10}$), cumulative 50th percentile particle diameter ($D_{50}$), and cumulative 90th percentile particle diameter ($D_{90}$) of each of the produced flaky silver powders on volume basis were measured in the following manner.

The silver powder (0.1 g) was added to 40 mL of isopropyl alcohol (IPA), and the resulting mixture was dispersed for 2 minutes by an ultrasonic homogenizer (US-150T, produced by NIHONSEIKI KAISHA LTD.; 19.5 kHz, chip-edge diameter: 18 mm), followed by measuring using a laser diffraction or laser scattering particle size distribution analyzer (Microtrac MT-3300 EXII, produced by MicrotracBEL Corp.).

<Measuring Methods for Aspect Ratio and Average Volume>

An aspect ratio of each of the produced flaky silver powders was determined by (cumulative average major axis L/cumulative average thickness T). The average volume of each of the produced flaky silver powders was determined by (cumulative average thickness T×Π×(cumulative average major axis L/2)$^2$). The "cumulative average major axis L" and the "cumulative average thickness T" are a cumulative average major axis and cumulative average thickness of 100 or more particles of the flaky silver powder measured by a scanning electron microscope.

<Measuring Method for Tapped Density>

A tapped density of each of the produced flaky silver powders was determined as follows. A tapped density measuring device (bulk specific gravity measuring device SS-DA-2, produced by SHIBAYAMA SCIENTIFIC CO., LTD.) was used, 15 g of the silver powder was weighed and collected in a 20 mL test tube, the test tube was tapped 1,000 times each with the drop of 20 mm, and the tapped density of the silver powder was calculated according to the following equation.

Tapped density=sample weight (15 g)/sample volume (mL) after tapping

<Ignition Loss of Silver Powder>

The ignition loss (Ig-Loss) of the silver powder was determined according to the following equation by weighing (w1) 2 g of the silver powder sample, charging a porcelain crucible with the weighed silver powder sample, intensively heating the silver powder sample for 30 minutes until the sample demonstrated the constant weight at 800° C., followed by cooling, and weighing (w2) the cooled sample.

$$\text{Ignition loss (\%)}=[(w1-w2)/w1]\times 100$$

<Production of Electrically Conductive Paste>

Each of the flaky silver powders of Examples 1 to 6 and Comparative Examples 1 to 3 (55.8% by mass), 37.2% by mass of an epoxy resin (EP-4901E, produced by ADEKA CORPORATION), 3.7% by mass of a curing agent (AJICURE MY-24, produced by Ajinomoto Fine-Techno Co., Inc.), and 3.3% by mass of a solvent (2-(2-butoxyethoxy) ethyl acetate, produced by FUJIFILM Wako Pure Chemical Corporation) were mixed, and the resulting mixture was kneaded for 1 minute by a propeller-less planetary centrifugal mixing and degassing device (VMX-N360, produced by EME, Inc.), to thereby produce each of electrically conductive pastes of Examples 1 to 6 and Comparative Examples 1 to 3.

Next, the viscosity of each of the obtained electrically conductive pastes was measured in the following manner. The results are presented in Table 1.

<Measurement of Viscosity of Electrically Conductive Paste>

The viscosity of each of the obtained electrically conductive pastes was measured by an E-type viscometer (DV-III+, produced by Brookfield Engineering Labs., Inc.) with a cone spindle CP-52, at the paste temperature of 25° C. and the number of rotations of 1 rpm.

<Formation of Electrically Conductive Film>

Each of the obtained electrically conductive pastes was used to print a circuit having a width of 500 μm and a length of 37.5 mm on an alumina substrate by a screen printing machine (MT-320T, produced by Micro-tech Co., Ltd.). Two circuits were printed consecutively, and the number of consecutive printing performed was two.

The obtained circuits were subjected to a heat treatment at 200° C. for 30 minutes by a hot air circulation dryer to thereby form each electrically conductive film.

The obtained electrically conductive films were evaluated on the average thickness of the electrically conductive film, the average line width, the volume resistivity, and continuous printability of the electrically conductive film in the following manner. The results are presented in Table 3.

<Measurement of Average Thickness and Average Line Width of Electrically Conductive Film>

The average thickness of each of the obtained electrically conductive films was measured by measuring a difference in height between an area of the alumina substrate on which the electrically conductive film was not printed and an area of the alumina substrate on which the electrically conductive film was printed using a surface texture measuring instrument (SURFCOM 480B-12, produced by TOKYO SEIMITSU CO., LTD.). Moreover, the line width (the average from two measurements) of the electrically conductive film was measured by a digital microscope. The results are presented in Table 3.

<Volume Resistivity of Electrically Conductive Film>

A resistance value of the electrically conductive film was measured between the points set along the length (distance) of the electrically conductive film by a digital multimeter (R6551, produced by ADVANTEST CORPORATION). The volume of the electrically conductive film was determined based on the size (the average thickness, the average line width, and length) of the electrically conductive film, and volume resistivity (the average from two measurements) was determined from the volume and the measured resistance value. The results are presented in Table 3. The electrically conductive paste achieves excellent practicality when the volume resistivity is 1.0E-03 Ω·cm or lower.

<Evaluation on Continuous Printability of Electrically Conductive Film>

During the consecutive printing performed twice, the average thickness, the average line width, and the volume resistivity of the electrically conductive film were measured after both the first printing and the second printing. A case where disconnection or significant increase in the resistance value was caused with the second electrically conductive film was determined as poor continuous printability (×). The results are presented in Table 3.

TABLE 1

| | Spherical silver powder (original powder) | | | Flaking step | | |
|---|---|---|---|---|---|---|
| | D50 | Mean primary particle diameter Dsem | Average volume V1 | Beads type | Bead diameter | Processing time |
| | Mm | µm | µm³ | | Mm | hr |
| Ex. 1 | 1.95 | 1.38 | 1.38 | Zirconia | 0.8 | 2.5 |
| Ex. 2 | 1.95 | 1.38 | 1.38 | | 0.5 | 3.0 |
| Ex. 3 | 1.95 | 1.38 | 1.38 | | 1.0 | 2.0 |
| Ex. 4 | 1.95 | 1.38 | 1.38 | | 0.8 | 4.0 |
| Ex. 5 | 1.81 | 1.26 | 1.05 | | 1.0 | 2.5 |
| Ex. 6 | 1.81 | 1.17 | 0.83 | | 0.8 | 4.0 |
| Comp. Ex. 1 | 1.95 | 1.38 | 1.38 | Stainless steel | 1.6 | 6.0 |
| Comp. Ex. 2 | 1.91 | 0.85 | 0.32 | Stainless steel | 1.6 | 6.0 |
| Comp. Ex. 3 | 1.95 | 1.38 | 1.38 | Zirconia | 0.5 | 1.0 |

TABLE 2

| | Flaky silver powder | | | | | | | | | | | |
|---|---|---|---|---|---|---|---|---|---|---|---|---|
| | Particle size distribution [µm] | | | | | | | | | | | |
| | D10 | D50 | D90 | Dmax | $\frac{D90-D10}{D50}$ | Tapped density g/mL | Ignition loss | Cumulative average thickness T nm | Cumulative average major axis L µm | Aspect ratio L/T | Average volume V2 µm³ | V2/V1 |
| Ex. 1 | 2.89 | 6.29 | 10.54 | 26.16 | 1.22 | 1.5 | 1.07 | 60.8 | 6.55 | 107.8 | 2.05 | 1.49 |
| Ex. 2 | 2.87 | 5.74 | 9.34 | 22.00 | 1.13 | 1.3 | 1.20 | 58.0 | 6.17 | 106.3 | 1.73 | 1.26 |
| Ex. 3 | 2.68 | 5.95 | 10.02 | 26.16 | 1.23 | 1.3 | 1.14 | 56.2 | 6.33 | 112.6 | 1.77 | 1.29 |
| Ex. 4 | 2.59 | 5.64 | 9.47 | 22.00 | 1.22 | 1.1 | 1.30 | 46.5 | 6.15 | 132.3 | 1.38 | 1.00 |
| Ex. 5 | 2.49 | 5.91 | 10.27 | 26.16 | 1.32 | 0.9 | 1.05 | 42.5 | 6.29 | 147.9 | 1.32 | 1.26 |
| Ex. 6 | 2.15 | 5.05 | 8.76 | 22.00 | 1.31 | 0.8 | 1.65 | 45.5 | 5.37 | 118.1 | 1.03 | 1.23 |
| Comp. Ex. 1 | 3.51 | 8.43 | 15.12 | 37.00 | 1.38 | 1.4 | 1.25 | 58.0 | 8.82 | 152.0 | 3.54 | 2.58 |
| Comp. Ex. 2 | 2.18 | 5.29 | 10.37 | 26.16 | 1.55 | 2.3 | 1.05 | 199.4 | 5.72 | 28.7 | 5.12 | 15.94 |
| Comp. Ex. 3 | 2.47 | 5.01 | 8.34 | 18.50 | 1.17 | 2.3 | 0.90 | 94.4 | 5.20 | 55.1 | 2.00 | 1.46 |

TABLE 3

| | Electrically conductive | Electrically conductive film | | |
|---|---|---|---|---|
| | paste Viscosity 1 rpm Pa · s | Average line width µm | Volume resistivity Ω · cm | Continuous printability |
| Ex. 1 | 345 | 526 | 8.5E−04 | Good (○) |
| Ex. 2 | 441 | 528 | 1.0E−03 | Good (○) |
| Ex. 3 | 468 | 519 | 1.0E−03 | Good (○) |
| Ex. 4 | 663 | 461 | 4.3E−04 | Good (○) |
| Ex. 5 | 675 | 474 | 6.4E−04 | Good (○) |
| Ex. 6 | 802 | 455 | 1.0E−03 | Good (○) |
| Comp. Ex. 1 | 699 | — | — | Poor (x) |
| Comp. Ex. 2 | 91 | 641 | 2.8E−03 | Good (○) |
| Comp. Ex. 3 | 71 | 661 | 3.1E−03 | Good (○) |

The invention claimed is:

1. A flaky silver powder production method, comprising:

flaking by allowing a spherical silver powder to collide with media to flake the spherical silver powder to thereby obtain a flaky silver powder, wherein the flaking is carried out in a manner that a ratio (V2/V1) of an average volume V2 to an average volume V1 is 1.0 to 1.5, where the average volume V1 is calculated according to the following equation 1 using a mean primary particle diameter ($D_{sem}$) in µm of the spherical silver powder as measured by a scanning electron microscope, and the average volume V2 is calculated according to the following equation 2 using a cumulative average major axis (L) in µm of the flaky silver powder, and a cumulative average thickness (T) in µm of the flaky silver powder:

$$V1=4/3\times\pi\times(D_{sem}/2)^3 \quad \text{(Equation 1)}$$

$$V2=T\times\pi\times(L/2)^2 \quad \text{(Equation 2)}$$

wherein a ratio $[(D_{90}-D_{10})/D_{50}]$ of a difference between a cumulative 90th percentile particle diameter ($D_{90}$) of the flaky silver powder and a cumulative 10th percentile particle diameter ($D_{10}$) of the flaky silver powder to the cumulative 50th percentile particle diameter ($D_{50}$) is 1.35 or less, where the cumulative 10th percentile particle diameter ($D_{10}$) and the cumulative 90th percentile particle diameter ($D_{90}$) are measured by laser diffraction or laser scattering particle size analysis, wherein the flaky silver powder has a tapped density of from 0.8 g/mL to 1.9 g/mL, and wherein a cumulative 50th percentile particle diameter ($D_{50}$) in μm of the spherical silver powder as measured by laser diffraction or laser scattering particle size analysis is from 1 μm to 2.5 μm.

2. The flaky silver powder production method according to claim 1, wherein a cumulative 50th percentile particle diameter ($D_{50}$) in μm of the flaky silver powder as measured by laser diffraction or laser scattering particle size analysis is from 2 μm to 7 μm.

3. The flaky silver powder production method according to claim 1, wherein the flaking is carried out in a manner such that the flaky silver powder includes at least some coarse particles of the flaky silver powder and at least some particles of the spherical silver powder that have not undergone plastic deformation, the coarse particles of the flaky silver powder being formed by joining particles of the spherical silver powder together with one another due to an impact applied by beads of the media.

* * * * *